United States Patent Office
3,684,522
Patented Aug. 15, 1972

3,684,522
PROCESS OF PREPARING FIBROUS
PROTEIN PRODUCTS
Charles A. Anker, 127 Rustic Lodge Ave. 55409, and Phyllis I. Burchill, 7316 Cedar Lake Road 55426, both of Minneapolis, Minn.
No Drawing. Filed Sept. 18, 1969, Ser. No. 859,197
Int. Cl. A23j *1/10, 1/14*
U.S. Cl. 99—17                                  18 Claims

ABSTRACT OF THE DISCLOSURE

Fibrous protein products are prepared by extruding plastic masses comprising keratin protein directly into a gaseous medium and then elongating the resulting extrudate. The products are edible and serve as substitutes for natural meats.

---

The present invention relates to the preparation of fibrous protein products, to the resulting products and to the use thereof. More particularly, it relates to a process of extruding certain keratin containing compositions under conditions yielding substantially solid, fiber containing products.

A variety of procedures have been disclosed in recent years for the preparation of fibers or other textured products from various protein sources, and especially from soy bean protein. These procedures generally involve either expansion of the protein containing composition or the formation of a spinning dope which is forced through a spinnerette into a set bath which coagulates the protein or other matrix. The products from these various processes are mainly intended to be used in the formation of what can be termed "meat analogs." Such meat analogs can be made to simulate various cuts of naturally occurring meats, fish and the like.

We have now discovered that fibrous protein products can be prepared from certain aqueous keratin containing plastic masses by simply extruding the same directly into a gaseous medium with elongation of the extrudate. No set baths are required and the heated plastic masses are not puffed to any significant extent.

As indicated the fibrous protein products are prepared in accordance with the present invention from plastic masses comprising keratin. Keratin is a protein found in various animals. Its essential function is to provide protection to the bodies of organisms, and is commonly found to be a principal constituent of hair, hooves, feathers, hides and the like. Although keratin may be isolated from these and other natural sources, it is preferred for this invention to isolate keratin from poultry feathers. The feathers may be whole or in ground form, although processing of the latter is generally more convenient.

The keratin useful in the process of the present invention can be isolated from the natural sources by various known procedures which preferably include the use of a reducing agent. The reducing agent appears to perform a variety of functions including increasing of the solubility or dispersibility of the keratin and/or improving the odor and/or flavor of the recovered isolate. When used during the initial isolation step, the reducing agent apparently increases the solubility or dispersibility of the keratin by breaking various disulfide bonds, both in the polypeptide chains (intrachain) and in the cross-linking of different polypeptide chains (interchain). When an alkali metal sulfide is used as the alkaline solubilizing agent, the keratin which is subsequently acid precipitated often has a bad odor indicating that hydrogen sulfide is being given off. Additionally, hydrogen sulfide may be given off during the precipitation step itself. In this instance, a reducing agent, such as an alkali metal sulfite appears to not only break some disulfide bonds but also to yield sulfurous acid which reacts with the hydrogen sulfide and any free sulfur formed during the sulfite solubilization or subsequent precipitation of the keratin. The products resulting from this reaction are theorized to be water soluble compounds such as $H_2S_2O_3$, $H_2S_3O_6$ and/or $H_2S_4O_6$. These compounds are not volatile and do not precipitate with the protein on addition of the acid precipitating agent.

One preferred procedure for isolating the keratin, as indicated above, comprises extracting same from the natural sources with an aqueous alkali metal sulfide solution, treating the resulting aqueous extract with an alkali metal sulfite and then precipitating the protein by the addition of an acid. The resulting product may also be dried if desired. This process can be used to recover keratin protein from any naturally occurring keratin source material, and is particularly valuable in the recovery of high quality keratin protein from feathers.

The first step of this preferred procedure is to extract the keratin source material with an aqueous solution of an alkali metal sulfide. Representative sulfides are sodium sulfide and potassium sulfide. Preferably the keratin source is in a relatively sub-divided form to promote the extraction. For example, whole feathers can be extracted with the sulfide solution but better extraction is obtained if the feathers are cut into smaller pieces. The extraction is preferably carried out at temperatures of about 20 to 50° C. The alkali metal sulfide is preferably used in an amount of about 2.5 to 20% by weight based on the weight of the material being extracted. It is also preferred to use relatively dilute solutions of the alkali metal sulfide. In this way the extracted keratin protein is more readily dissolved in the extracting medium. Thus the aqueous solutions preferably contain from about 0.25 to 2% by weight of the alkali metal sulfide and enough of the solution is used so that the concentration of the extracted keratin protein therein remains below about 15% by weight, and is preferably in the range of 1 to 10% by weight. Sodium sulfide ($Na_2S$) is the preferred extractant.

The protein containing solution is separated from the insoluble residue by conventional means such as decantation, filtration or the like. The insoluble residue can be further extracted or washed with water or fresh aqueous sulfide solution and the resulting liquids can be treated separately or combined with the first obtained protein containing solution. In this way, the ultimate yield of protein is increased somewhat although the major amount of the protein is normally obtained in the initial extraction step.

The protein containing solution is next treated with the alkali metal sulfite. Representative sulfites are sodium and potassium sulfite and bisulfite. A preferred treating agent is sodium sulfite ($Na_2SO_3$). The alkali metal bisulfites, such as sodium bisulfite ($NaHSO_3$), are less preferred since they release sulfur dioxide at a faster rate and thus may cause some localized premature precipitation unless added at a slower rate than the sodium sulfite. The sulfite is used in a molar excess in relation to the amount of alkali metal sulfide used in the initial extraction step. Preferably the molar ratio of the sulfite to the sulfide is in the range of 1.01–10.0:1.0. The sulfite in dry form or in the form of an aqueous solution thereof is simply added to the protein containing solution in the designated amount. The protein containing solution can be stirred during or after the addition to effect a more uniform distribution of the sulfite therein.

After the described sulfite treating step, the protein is precipitated by the addition of acid in the conventional manner. Any of a variety of inorganic or organic acids can be used. Representative acids are hydrochloric acid, sulfuric acid, acetic acid, phosphoric acid and the like. The acid is used in an amount sufficient to lower the pH of the protein containing solution to the isoelectric point or below that of the protein. Preferably, the pH is reduced to below about 4.5 and the range of 3.0 to 4.5 is especially suitable.

The precipitated protein is separated from the protein barren liquid by conventional techniques—i.e., decantation, filtration and the like. In all of the steps of the process the temperature is not critical but is preferably in the range of 20 to 50° C.

The precipitated and separated protein can be dried if desired. Any conventional drying technique can be used—i.e., spray, drum, tray, freeze or the like. The resulting keratin protein is a high quality product having good odor, color and flavor characteristics.

The following specific examples will serve to illustrate this preferred process of recovering the keratin from natural sources.

EXAMPLE A

One hundred grams of cut turkey feathers were added to 1333 ml. of an aqueous solution of sodium sulfide (the solution consisted of water and 32 g. $Na_2S \cdot 9H_2O$). The resulting mixture was held at 40° C. for two hours and then centrifuged for 20 minutes at 2000 r.p.m. The supernatant liquid was decanted and saved. The residue was mixed with 1333 ml. of water and then centrifuged as above. The second supernatant liquid was decanted and saved. The residue was discarded. Each of the supernatant liquids was made 0.3 molar with respect to sodium sulfite (50.4 g. sodium sulfite added to each). The pH of each of the liquids was adjusted to pH 4.2 by the addition of 6 N hydrochloric acid (the first required 81 ml. and the second 53 ml. of the acid). During the acidification of the liquids no hydrogen sulfide was liberated and no sulfur dioxide odor was noted. The resulting precipitates were separated from the liquids by centrifugation and washed once with 0.01 N hydrochloric acid (one liter) and 3 times with one liter portions of acetone. The protein was then allowed to air dry at room temperature. There was obtained 60.4 g. protein from the first supernatant liquid and 8.1 g. protein from the second supernatant liquid. The protein was light colored, bland and substantially odor free.

EXAMPLE B

Keratin was isolated from chicken feathers by the following pilot plant scale operation. Forty-five and one-half pounds of clean, dry chicken feathers were mixed with 75 gal. water containing 8.1 lb. of commercial grade sodium sulfide (60% $Na_2S$). The temperature of the mixture was 103° F. The mixture was agitated for two hours and the temperature of the resulting digest mixture was 98° F. The digest was passed through a coarse screen to remove pieces of the undigested feather residue. To the digest was added 90 gal. water containing 23.6 lb. commercial grade sodium sulfite. The pH of the digest was lowered to 8.2 by adding 100 lb. 1 N hydrochloric acid. The digest was then filtered through a filter press using 28 lb. filter aid and a 1 x 1 filter cloth. The filtering time was 2 hours. The clear amber filtrate collected was pH 8.7. To the filtrate was added 190 lb. 1 N HCl over about 130 min. to lower the pH to 4.2. The resulting protein precipitate was allowed to settle overnight, and the supernatant liquid was removed. The precipitate was washed with 60 gal. water and allowed to settle in the supernatant wash water for 5 hr., after which time the supernatant liquid was removed. An additional 60 gal. water was added to the precipitate and allowed to stand overnight. The supernatant liquid was removed and the protein precipitate was collected by filtering. The protein cake thus formed was freeze dried to yield 11.55 lb. of dry keratin protein.

Additional processes or procedures other than the preferred one described above, may be used to isolate keratin in a form suitable for use in our invention. One such procedure involves digesting keratin source materials (e.g. poultry feathers) in an alcohol-water mixture which contains ammonium sulfite. In another satisfactory process for obtaining keratin suitable for use in our invention, keratin source materials are digested in a mercapto-ethanol-alcohol-water mixture and filtered to remove impurities, and the keratin is obtained by centrifugation of the resulting gel mixture. In a further satisfactory process of obtaining keratin, the latter method is followed, except that the mercaptoethanol-alcohol-water mixture is made alkaline by the addition of a base such as sodium hydroxide, potassium hydroxide and the like. In these procedures for isolating keratin, the ammonium sulfite and mercaptoethanol reducing agents act primarily as aids for increasing the solubility or dispersibility of the keratin protein.

The following examples will serve to illustrate these additional suitable processes we have used for obtaining keratin isolates useful in our invention.

EXAMPLE C

A mixture consisting of 370 g. wet chicken feathers (200 g., dry basis), 29.7 g. $(NH_4)SO_3 \cdot H_2O$, 221 ml. 1 N hydrochloric acid, 715 ml. water and 1110 ml. methyl alcohol was adjusted to a pH of 6 by addition of 1 N NaOH and was heated to boiling and then refluxed for 40 minutes. The mixture was then centrifuged to separate a liquid fraction. The resulting non-liquid portion of the mixture was a gel-like mass. To this was added 1000 ml. water and 1000 ml. methyl alcohol, and the resulting mixture was heated to a boil and then filtered while hot through cheesecloth to remove undigested feather residue. This filtered mixture and the liquid fraction from the centrifugation step were each heated to encourage homogeneity, and each mixture was adjusted to a pH of 4.5 by addition of 1 N hydrochloric acid. The two mixtures were allowed to stand overnight, and were then filtered together through cheesecloth to remove the alcohol-water liquor and then keratin product thus isolated was dried in a vacuum oven. The yield was 129 g.

EXAMPLE D

A mixture consisting of 370 g. wet chicken feathers (200 g., dry basis), 1830 ml. water, 2000 ml. 95% ethyl alcohol and 20 ml. mercaptoethanol was heated to 80° C. and refluxed at that temperature for 20 minutes. The mixture was filtered while hot through cheesecloth to remove undigested feather residue. The filtered mixture was allowed to stand for about 60 hours, during which time the mixture assumed the character of a white gel. This gel mixture was centrifuged to remove a fraction of excess liquid, and was then vacuum dried at 50° C. The dried product was ground to a fine powder consistency. The yield was 105 g. of isolated keratin.

EXAMPLE E

A mixture of 370 g. wet chicken feathers (200 g., dry basis), 2230 ml. water, 9.6 g. sodium hydroxide, 1600 ml. 95% ethyl alcohol and 40 ml. mercaptoethanol was heated to boiling and was held there for 20 minutes. The mixture was filtered while hot and centrifuged to remove undigested feather residue. The pH of the mixture was reduced to 6 to 7 by addition of 1 N hydrochloric acid, and the mixture was allowed to stand overnight. The mixture, which had assumed a gel-like character, was centrifuged to remove excess solvents, and the solids fraction was vacuum dried at 50° C., to yield 121.8 g. keratin.

EXAMPLE F

Seven batches of keratin were removed from feathers according to the following procedure. A mixture of 200 g. dry feathers, 970 ml. water, 29.7 g. $(NH_4)_2SO_3 \cdot H_2O$, 60 ml. 1 N hydrochloric acid and 1110 ml. 95% ethanol, having a pH of about 6, was refluxed for 40 minutes. To the refluxed mixture were added 1110 ml. water and 1110 ml. 95% ethanol. The resulting mixture was filtered while hot through cheesecloth and adjusted to a pH of 4.5 by addition of hydrochloric acid. The mixture was allowed to cool and to set to a gel overnight, and was then centrifuged to remove excess liquid. The solids fraction after centrifugation was washed with portions of water and recentrifuged three times. The resulting keratin product was freeze dried. The total keratin thus isolated from the seven batches of feathers was ground to a fine powder consistency and weighed 710 g.

The fibrous protein products of our invention are prepared from heated plastic masses comprised of keratin isolated by procedures such as above described. In addition to the keratin, the extrudable plastic masses may also contain reducing agents, bases, other proteinaceous substances, plasticizing agents, alcohols, fats or oils, flavoring agents, coloring agents and the like.

The weight ratio of protein to liquid (not including liquid plasticizers if such are used) in the extrudable plastic masses is from about 5:2 to 5:9. The liquid is water or certain water-alcohol mixtures as will be described more fully hereinbelow.

The extrudability of the keratin containing plastic masses can be improved or optimized by the addition of various reducing agents, bases and/or alcohols. While we do not wish to be bound by the following theory, it is believed that the above agents improve the extrudability of the mass by attacking various chemical forces in the keratin and other proteins when used in combination with the keratin. These are cohesive chemical forces within and among the protein moieties and include: (1) interchain and intrachain disulfide bonds; (2) hydrogen bonding among various polar groups; (3) hydrophobic bonding among nonpolar residues; and (4) certain charge interactions or ionized residues. Of these several forces, it is thought that the first two most seriously contribute to the cohesive nature of the protein and correspondingly to the difficulties encountered in obtaining optimum extrudability.

Any of a variety of water soluble reducing agents may be used to reduce various of the disulfide bonds in the isolated keratin polypeptides as well as disulfide bonds of other proteinaceous substances which may be included in the compositions. Among the preferred reducing agents are sodium sulfite, sodium bisulfite, ammonium sulfite, ammonium bisulfite and mercaptoethanol. The reducing agent is used in an amount sufficient to increase the extensibility of the extruded products. Where no reducing agent is used during the isolation procedure and little or no reducing agent is added to the isolated keratin containing aqueous mass, the extrudability of the plastic mass may be quite poor and the resulting fibrous products have a tendency to be weak and nonhomogeneous and thus of considerably reduced value. Thus, it is preferred to use keratin which has been isolated by a process which includes the use of a reducing agent and also add the same or different reducing agent to the isolated keratin containing aqueous mass. It is to be noted, however, that the reducing agent should not be used in amounts which excessively degrade the keratin protein—i.e. cause same to be substantially completely broken down and solubilized. It is also to be noted that the optimum amount of reducing agent to be added to the isolated keratin containing composition will generally be within the range of about 0.5 to 5.0% by weight based on the weight of the protein, the precise amount varying with each particular reducing agent and on other factors including the particular isolate employed, the presence or absence of other modifying agents, proteins and the like, and the particular extrusion conditions employed—temperature, protein to liquid ratio, etc. Sodium sulfite or ammonium sulfite are the preferred reducing agents to be used in the preparation of the fibrous products.

It is often also preferred to include a base in the extrudable mass. Such basic substance seems to perform a two-fold function. Thus the same appears to lessen or negate the effect of hydrogen bonding among polar groups in the keratin polypeptides and therefore aid in dispersing the protein in the mixtures. It is also thought that certain charge interactions or ionized residues in the protein which contribute to the protein's cohesive character may be lessened where the extrudable mixture is made alkaline—i.e. has a pH of above 7.0. A wide variety of organic and inorganic bases may be used including amines, hydroxides, oxides, basic salts and the like. The preferred bases are the water soluble hydroxides, and especially the alkali metal hydroxides—i.e. sodium and potassium hydroxide—and ammonium hydroxide. The latter compound is particularly preferred because of its volatility.

When used, the base is added in an amount sufficient to increase the dispersibility of the protein in the extrudable composition. The base is preferably used in an amount of about 2 to 6% by weight based on the weight of the protein.

Monohydroxy aliphatic alcohols may also be included in the extrudable mixtures. When used, such alcohols are thought to lessen the effect of hydrophobic bonding among nonpolar residues in the protein and thus aid in the dispersing of the protein. In view of the increase in dispersibility of the protein, the presence of the alcohol also tends to lower the extrusion temperature. Additionally, where the protein used is keratin alone or keratin with only small amounts of a second protein or proteins, the alcohol aids in the holding of liquid in the extruded fibrous product. The alcohols contain less than about 10 carbon atoms and preferably contain 1 to 4 carbons. Illustrative of the preferred alcohols are methanol, ethanol, isopropanol, propanol, n-butanol and the like. While alcohols containing more than five carbon atoms may be used, they are not preferred since they tend to cause the need for higher temperatures to form a composition which is homogeneous, non-waxy and suitable for extrusion. We have found that good products can be formed where up to about 95% by volume alcohol, preferably ethanol, is used in place of the usual water portion of the extrudable mixture.

Certain ingredients may be included which impart increased flexibility to the fibrous products. Such ingredients may be termed "plasticizers," and include a variety of polyols and higher molecular weight alcohols such as glycerol, diglycerol, propylene glycol, polyoxyethylene derivatives of glycerol, 1,2,6-hexanetriol, triethanolamine, and the like. Preferred plasticizers comprise glycerol, diglycerol, propylene glycol and 1,2,6-hexanetriol. For example, glycerol has been used in amounts up to about 60% of the weight of the protein, although amounts up to about 50% are preferred.

When no plasticizer is included in the plastic mass, initially flexible fibrous products may be extruded. However, such products tend to become somewhat brittle upon drying. Thus where it is desired to form products which will retain their flexibility, it is nescessary either to include a plasticizer in the extrudable composition or to subject the extruded fibrous product to a plasticizing treatment. Where a plasticizer is included in the extrudable composition, enough should be used that the desired flexibility is attained. Thus where a plasticizer is included, it is preferred that the weight ratio of protein to plasticizer be about 5:1 to 2:1.

When desired flexibility in the extruded fiborus product is achieved by subjecting the product to a plasticizing treatment, means serving to bring the plasticizer in contact with the product will serve this result. For example, a solution of about 20 to 80% by weight glycerol in water or up to 95% ethanol provides a suitable plasticizing bath to which the extruded fibrous products may be subjected.

As indicated previously, a second particulate protein or proteins may be used in combination with the keratin protein in the extrudable mixtures used to prepare the fibrous products of the present invention. Such second protein or proteins may be used to replace up to about 70% by weight of the keratin protein in the extrudable mixture. The amount of replacement will vary for each second protein or mixtures thereof and will be below the point where the formation of the fibrous product is impeded.

The second protein is preferably selected from the group consisting of wheat gluten, casein, zein, gelatin, oilseed proteins, leaf proteins, fish proteins and mixtures thereof. Soy protein is representative and preferred of the oilseed proteins.

Since the fibrous products are to be used as foods or ingredients in food compositions primarily as replacements for natural meats, various oils and fats, flavoring agents, and coloring agents can be added to the extrudable composition or to the fibrous product after it has been formed. Such materials include beef tallow, lard, chicken fat, vegetable oils, various salts, natural and artifical beef, chicken and the like flavoring materials, and various edible dyes and colorants. A surprising property of the fibrous products of the invention is that they can be added in unflavored form to various casserole preparations and they readily pick up the flavor of the other casserole ingredients while giving meat like texture to the casserole such as would be given by natural cooked ground beef pieces.

The extrudable plastic mass is prepared by mixing and heating the above-described ingredients. Such mixing can be carried out by hand or with the aid of any of various commercially available mixing machines. The ingredients are heated to temperatures sufficient to form the relatively homogeneous extrudable plastic mass and such temperatures are essentially maintained until the mass is extruded. The temperature is kept below the point where the mass, upon extrusion, would puff to any significant or appreciable extent. Temperatures in the range of about 70 to 190° C. are preferred for the formation of the extrudable plastic mass and the subsequent extrusion.

The formation of the plastic mass and the extrusion can preferably be carried out in one operation by using an extruder equipped with means for mixing and heating the ingredients and a screw to continuously advance the forming plastic mass to the extrusion orifice. Thus in the examples which follow, we used a Brabender type 200 extruder. This extruder has three zones in which heat can be applied to the ingredient mixture. In the first zone, the first portion of the extruder barrel, the mixture is heated to a temperature lower than that of the succeeding zones, and between about 30° C. and 85° C. In the second zone, the second portion of the extruder barrel, the temperature during extrusion is maintained at between about 40° C. to about 190° C.; and in the third zone, the extruder die, the temperature is about 70° C. to about 190° C. As indicated above, enough heat is needed to encourage thorough mixing reacting and dispersing of the ingredients, but if the resulting plastic mass is too hot, flashing of the solvent or puffing may occur upon extrusion.

Ordinarily and preferably, the plastic mass is extruded into air or other gaseous medium at ambient room temperatures and at atmospheric pressure. Of course, sufficient pressure is applied to the hot plastic mass to force same through the extrusion die or orifice. In other respects, the extrusion pressure is not critical. Although no reason is seen for doing same, the extrusion of the mass can be into air or other gaseous medium at pressures higher or lower than atmospheric pressure. Where such pressures are higher than atmospheric pressure, a somewhat higher hot melt temperature than the preferred ranges set forth above may be accommodated without causing flashing of the solvent or puffing in the extruded fibrous product. However, even with such higher pressures, the temperature of the plastic mass should not be so high as to decompose or undely degrade the protein or other ingredients of the mass or cause charring thereof. Exarusion into atmospheres having pressures lower than atmospheric pressure can also be used. However, while some reduction in temperature could be made, the temperature still must be sufficient to yield the extrudable plastic mass. The medium into which the mass is extruded is preferably and most practically maintained at ambient room temperature. However, higher or lower temperatures can be used if desired.

It is to be understood that the extrusion step of the present invention can be carried out in any extruder apparatus wherein the plastic mass can be extruded at the temperatures described.

The plastic mass may be extruded through any of a variety of orifices or dies to yield ribbons, rods, sheets and the like. There is nothing especially critical about the particular shape of the extrudate leaving the orifice other than it should not be so thin or so large as to present handling difficulties upon being elongated or stretched to form an internal fibrous structure therein.

As indicated, the final step of the process of the invention is the elongating or stretching of the extruded plastic mass. Such elongation is in an amount sufficient to cause the extruded plastic mass to form an internal fibrous structure. The extruded mass is normally stretched in an amount such that the cross section area thereof is reduced at least about 5%. Additionally, the elongation must take place prior to the loss of plasticity by the extruded mass. Thus, it is preferred that the mass is elongated as it leaves the extruder orifice. In any event, the elongating step must be completed prior to a reduction in temperature of the extruded mass much below about 70° C. There is no upper limit on the amount of stretching although it is preferred, for processing convenience, that the stretching is stopped prior to separation or breakage of the extruded mass.

The fibrous products of out invention can be cut into pieces of varying lengths and/or thicknesses. Such pieces find particular use as ingredients in casseroles and the like.

The following examples which are not to be considered as limiting illustrate preferred embodiments of the present invention.

EXAMPLE I

A solution containing 10 ml. water, 5 ml. 6 N $NH_4OH$ 5 ml. 95% EtOH, 25 g. glycerol and 10 g. $(NH_4)_2SO_3$ was mixed in a Waring Blender wth 50 g. feather keratin as prepared by the method in Example B. The resulting mixture was formed into a plastic mass and extruded using the Brabender extruder having a ½″ diameter extrusion orifice. The temperatures in the three heating zones of the extruder were 75° C., 115° C., and 115° C., respectively. As the extruded rope left the orifice, it was stretched to about twice its initial length. The product was very fibrous and had a meat-like texture after being cooled to room temperature.

EXAMPLE II

A solution containing 100 ml. water, 20 ml. 6 N $NH_4OH$ 50 g. glycerol and 3 g. $Na_2SO_3$ was mixed in a Waring Blender with 40 g. soy isolate (approximately 95% by weight protein) and 60 g. feather keratin as prepared in Example B. The resulting mixture was formed into a plastic mass and extruded using the Brabender extruder equipped with a 1″ wide ribbon die having a 5 mil gap. The temperatures in the three heating zones of the extruder were 80, 100 and 95° C., respectively. As the extruded ribbon left the die, it was stretched so that it had a width of approximately ½". The extruded product was very fibrous.

EXAMPLES III-V

Example II was essentially repeated except that the ratio of soy protein to feather keratin was changed as follows:

Example III
  50 g. soy isolate
  50 g. feather keratin

Example IV
  60 g. soy isolate
  40 g. feather keratin

Example V
  70 g. soy isolate
  30 g. feather keratin

In all instances a fibrous product was obtained on stretching of the extruded ribbon. As the level of soy isolate was increased, the fibrous texture of the product was reduced. Thus in a similar run using 80 g. soy isolate and 20 g. feather keratin, the extruded and stretched ribbons contained no noticeable fibers.

EXAMPLE VI

A solution containing 50 ml. water, 10 ml. 6 N $NH_4OH$, 1.5 g. $Na_2SO_3$ and 25 g. glycerol was mixed in a Waring Blender with 15 g. soy isolate (approximately 95% by weight protein) and 35 g. feather keratin as prepared in Example B. The resulting mixture was allowed to stand overnight at room temperature. The mixture was formed into a plastic mass and extruded using the Brabender extruder fitted with the die as used in Example II. The temperatures in the three heating zones of the extruder were 80° C., 100° C., and 100° C., respectively. The extruded ribbon was elongated by stretching as in Example II. The product was very fibrous. Portions thereof were cut into ¼" lengths and flavored by soaking the pieces in a solution containing bacon flavoring. Upon frying, these pieces had texture and flavor similar to that of fried bacon. Further portions of the stretched fibrous product were cut into ¼" square pieces and dried. The dried pieces were incorporated into a commercial tomato-noodle casserole mix as a substitute for chopped beef. When the casserole was prepared for eating, the pieces absorbed the flavors of the casserole mix and had a texture similar to that of chopped beef.

EXAMPLE VII

Example II was essentially repeated using 1% ammonium sulfite based on the weight of the protein instead of 3% sodium sulfite. Results were essentially the same with the product being fibrous.

EXAMPLES VIII-X

Fibrous products were prepared essentially as in Example VI except that the 3% sodium sulfite based on the weight of the protein was replaced by 1% sodium sulfite, 1% mercaptoethanol and 1% ammonium sulfite, respectively. Good fibrous products were obtained.

EXAMPLE XI

Example VI was essentially repeated except that the amount of $Na_2SO_3$ was reduced to 1% based on the weight of the protein and 23.7 g. hydrogenated vegetable oil were added to the mixture prior to formation of the plastic mass and extrusion. A fibrous product containing internal fat was thus obtained.

EXAMPLE XII

Example XI was essentially repeated except that the soy isolate was replaced by an equal amount of wheat gluten (Pro-80 which is a flash dried vital wheat gluten which may contain several percent moisture and on a moisture-free basis is comprised of about 80% vital wheat gluten, 5-10% fat and 10-15% starch). A product having a tough, fibrous meat-like texture was obtained.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. The process of preparing an edible fibrous protein product which comprises: (1) forming an extrudable plastic mass by mixing and heating a composition containing a proteinaceous substance comprising at least about 30% by weight keratin protein and a liquid comprising water wherein the protein to liquid weight ratio is in the range of about 5:2 to 5:9 and the composition is heated to temperatures of at least about 70° C. but below the decomposition temperature of the protein contained therein and below the temperature where the mass would puff to any appreciable extent upon extrusion; (2) extruding the heated plastic mass through an orifice into a gaseous medium to form an extrudate which is not puffed to any appreciable extent; and (3) elongating the extrudate prior to loss of plasticity of the extruded mass to form an internal fibrous structure and thus yield the edible fibrous protein product.

2. The process of claim 1 wherein the composition also contains a reducing agent in an amount of about 0.5 to 5.0% based on the weight of the protein in the composition.

3. The process of claim 2 wherein the reducing agent is sodium sulfite.

4. The process of claim 2 wherein the reducing agent is ammonium sulfite.

5. The process of claim 1 wherein the proteinaceous substance consists of 100% keratin protein.

6. The process of claim 1 wherein the proteinaceous substance consists of a mixture of keratin protein and soy protein.

7. The process of claim 1 wherein the composition also contains a base in an amount sufficient to increase the dispersibility of the protein in the plastic mass.

8. The process of claim 7 wherein the base is a water soluble hydroxide.

9. The process of claim 8 wherein the water soluble hydroxide is ammonium hydroxide.

10. The process of claim 1 wherein the composition also contains a plasticizer in an amount sufficient to increase the flexibility of the edible fibrous protein product.

11. The process of claim 10 wherein the plasticizer is glycerol.

12. The process of claim 1 wherein the plastic mass is heated to temperatures in the range of about 70 to 190° C. prior to the extrusion thereof.

13. The process of claim 1 wherein the gaseous medium is air at ambient room temperature and atmospheric pressure.

14. The process of claim 1 wherein the elongating takes place as the extrudate leaves the orifice.

15. The process of claim 1 wherein the extrudate is elongated in an amount such that the cross section area thereof is reduced in an amount of at least about 5%.

16. The process of claim 2 wherein the reducing agent is sodium sulfite, the proteinaceous substance consists of a mixture or keratin protein and soy protein, the composition also contains ammonium hydroxide in an amount sufficient to increase the dispersibility of the protein in the plastic mass, the composition also contains glycerol in an amount sufficient to increase the flexibility of the edible fibrous protein product, the gaseous medium is air at ambient room temperature and atmospheric pressure, and the elongation takes place prior to any significant reduction in temperature of the extrudate.

17. The edible fibrous protein product prepared by the process of claim 1.

18. The edible fibrous protein product prepared by the process of claim 16.

References Cited

UNITED STATES PATENTS

| | | | |
|---|---|---|---|
| 3,498,794 | 3/1970 | Calvert et al. | 99—17 |
| 3,537,859 | 11/1970 | Hamdy | 99—17 |
| 2,952,543 | 9/1960 | Szczesniak et al. | 99—14 |
| 3,093,483 | 6/1963 | Ishler et al. | 99—14 X |

RAYMOND N. JONES, Primary Examiner

W. A. SIMONS, Assistant Examiner

U.S. Cl. X.R.

99—14, 18

PO-1050
(5/69)

UNITED STATES PATENT OFFICE
CERTIFICATE OF CORRECTION

Patent No. 3,684,522              Dated August 15, 1972

Inventor(s)   Charles A. Anker and Phyllis I. Burchill

It is certified that error appears in the above-identified patent and that said Letters Patent are hereby corrected as shown below:

Column 1, line 6, after "Minneapolis, Minn." insert -- assignors to General Mills, Inc." --.

Column 3, line 4, after "below" delete "that".

Column 4, line 24, "$(NH_4)SO_3$" should read -- $(NH_4)_2SO_3$ --.

Column 6, line 68, "fiborus" should read -- fibrous --.

Column 7, line 61, "solvent" should read -- solvents --.

Column 8, line 40, "out" should read -- our --.

Signed and sealed this 24th day of April 1973.

(SEAL)
Attest:

EDWARD M. FLETCHER, JR.
Attesting Officer

ROBERT GOTTSCHALK
Commissioner of Patents